United States Patent

[11] 3,554,289

| [72] | Inventor | Thomas O. Webb<br>Tulsa, Okla. |
|---|---|---|
| [21] | Appl. No. | 762,140 |
| [22] | Filed | Sept. 24, 1968 |
| [45] | Patented | Jan. 12, 1971 |
| [73] | Assignee | Marathon Oil Company<br>Findlay, Ohio<br>a corporation of Ohio |

[54] USE OF MICELLAR SOLUTION AS AN EMULSION "BREAKER"
20 Claims, No Drawings

[52] U.S. Cl. .................................................. 166/305
[51] Int. Cl. .................................................. E21b 43/25
[50] Field of Search........................................... 166/305,
306, 274, 275, 263; 252/8.55B

[56] References Cited
UNITED STATES PATENTS

| 2,331,594 | 10/1943 | Blair, Jr. ................ | 166/305UX |
| 2,356,205 | 8/1944 | Blair, Jr. et al. ........... | 252/8.55 |
| 2,369,831 | 2/1945 | Jones et al. ............... | 252/8.55 |
| 3,185,217 | 5/1965 | Brooks, Jr. et al. ......... | 166/305X |
| 3,254,714 | 6/1966 | Gogarty et al. ............ | 166/274 |
| 3,402,770 | 9/1968 | Messenger.................. | 166/305 |

OTHER REFERENCES
Frick, PETROLEUM PRODUCTION HANDBOOK, RESERVOIR ENGINEERING, Vol. II, McGraw-Hill Book Co., New York, (1962) (pages 48-2 and 48-3 relied on) Copy in Gp 354.

*Primary Examiner*—Stephen J. Novosad
*Attorneys*—Joseph C. Herring, Jack L. Hummel and Richard C. Willson, Jr.

ABSTRACT: Production of formation fluids through a well bore from a hydrocarbon-bearing subterranean formation having a water and hydrocarbon emulsion blockage surrounding the well bore is restored by injecting from about 0.01 to 10 barrels per vertical foot of hydrocarbon-bearing formation of micellar dispersion into the formation to "solubilize" the emulsion.

USE OF MICELLAR SOLUTION AS AN EMULSION "BREAKER"

BACKGROUND OF THE INVENTION

Production of oil and gas wells often experiences a sudden or gradual decrease in the production of hydrocarbons. In some cases, the hydrocarbon production may stop altogether. Such can be caused by an emulsion block in the hydrocarbon-bearing formation, i.e. a viscous emulsion of water and hydrocarbon is formed around the well bore and adversely affects the advance of hydrocarbon to the well bore.

The prior art teaches that surfactants suspended in a carrier, such as crude oil or water, are useful to overcome the emulsion blockage. Such a process has proved satisfactory in many cases.

In some cases, blockage is characteristic of a "one-way emulsion blockage," i.e. fluid can be pumped without difficulty into the formation but when the formation is restored to production, the well will not produce. The so-called "native emulsion" is sometimes characteristic of phenomenon.

Applicants have discovered that emulsion blockage in the formation can be removed by injecting a sufficient amount of a micellar dispersion into the formation to "solubilize" the emulsion. Once the emulsion is "solubilized" the formation is returned to production. Increases in hydrocarbon production are realized. The term "solubilization" as used herein is broadly but not specifically meant to include takeup or partial takeup of the emulsion by emulsification or sorption by the micellar dispersion to substantially overcome the adversity imparted by the emulsion to the flow of hydrocarbon within the formation.

DESCRIPTION OF THE INVENTION

The term "micellar dispersion" as used herein is meant to include micellar solutions, microemulsions, "transparent" emulsions (Blair, Jr. et al., U.S. Pat No. 2,356,205), aqueous soluble oils and micellar solution technology taught in C. G. Sumner, Clayton's, The Theory of Emulsions and Their Technical Treatment, 5th Edition, pp. 315—320, (1954). Specific examples of useful micellar solutions include those defined in U.S. Pat. Nos. 3,254,714 and 3,275,075 to Gogarty et al. and 3,307,628 to Sena. Micellar dispersions differ in many ways from emulsions, basically the micellar dispersion is thermodynamically stable and generally transparent whereas emulsions are not thermodynamically stable systems and are generally opaque.

The micellar dispersion is composed of hydrocarbon, aqueous medium, and surfactant. Cosurfactant(s) and electrolyte(s) can optionally be incorporated within the micellar dispersion. Examples of volume amounts include from about 4 percent to about 60 percent or more of hydrocarbon, from about 20 percent to about 90 percent aqueous medium, at least about 4 percent surfactant, from about 0.01 to about 20 percent cosurfactant (also identified as cosolubilizer and semipolar organic compound), and from about 0.001 to about 5 percent or more (weight percent based on aqueous medium) of electrolyte. The micellar dispersion contains at least 5 percent aqueous medium.

The micellar dispersion can be oil-external or water-external. Where the emulsion blockage is oil-external, it is preferred to use an oil-external micellar dispersion. However, where the emulsion blockage is water-external, a water-external micellar dispersion can be effectively used.

Examples of hydrocarbon useful in the micellar dispersion include crude oil, partially refined fractions of crude oil, and refined fractions of crude oil. Specific examples of such hydrocarbons include side cuts from crude columns, crude column overheads, gas oils, kerosenes, heavy naphthas, naphthas, straight run gasoline, liquefied petroleum gases, propane, pentane, heptane, decane, dodecane, cyclohexane, aryl compounds, substituted aryl compounds, etc. Preferably, the hydrocarbon is one locally available and can be characteristic of the hydrocarbon within the particular formation being treated. Unsulfonated hydrocarbon within a petroleum sulfonate, e.g. unsulfonated gas oils, are useful as the hydrocarbon.

The aqueous medium can be soft, brackish, or brine water. When the aqueous medium contains ions, it is preferred that these ions be compatible or characteristic of the ions within the formation fluids.

Useful surfactants within the micellar dispersion include nonionic, cationic, and anionic surfactants. Specific examples include those surfactants contained in U.S. Pat. No. 3,254,714 to Gogarty et al. Other useful surfactants include Duponol WAQE (a 30 percent active sodium lauryl sulfate marketed by DuPont Chemical Corporation, Wilmington, Delaware), Energetic W-100 (a polyoxyethylene alkyl phenol marketed by Armor Chemical Company, Chicago, Illinois), Triton X-100 (an alkylphenoxy polyethoxy ethanol marketed by Rohm & Haas, Philadelphia, Pennsylvania) and Arquad 12—50 (a 50 percent active dodecyl trimethyl ammonium chloride marketed by Armour Chemical Company, Chicago, Illinois), and like materials.

Preferably, the surfactant is a petroleum sulfonate, also known as alkyl aryl naphthenic sulfonates. A particularly useful sulfonate is a monovalent cation containing sulfonate, e.g. sodium and ammonium petroleum sulfonate. Preferably the petroleum sulfonate has an average molecular weight within the range of from about 360 to about 520 and more preferably from about 400 to about 450. The surfactant can be a mixture of low, medium, and high molecular weight sulfonates or a mixture of two or more different surfactants.

The cosurfactant useful with this invention includes alcohols, amino compounds, esters, aldehydes, ketones, and like materials containing from about 1 to about 20 or more carbon atoms. Preferably, the cosurfactant contains from about 3 to about 16 carbon atoms. Specific examples include alcohols such as isopropanol, n- and iso-butanol, amyl alcohols such as n-amyl alcohol, 1- and 2-hexanol, 1- and 2-octanol, decyl alcohols, dodecyl alcohols, etc., and alkaryl alcohols such as p-nonylphenol and alcoholic liquors such as fusel oil. As mentioned previously, concentrations within the range of from about 0.1 to about 20 percent or more by volume of cosurfactant are useful and more preferably from about 0.1 to about 5 percent. Mixtures of two or more cosurfactants are also useful.

Electrolytes useful within the micellar dispersion include inorganic salts, inorganic acids, inorganic bases, organic acids, organic bases and organic salts. Preferably, the electrolyte is compatible with the ions within the formation fluids. Specific examples of electrolytes include sodium hydroxide, sodium chloride, sodium sulfate, hydrochloric acid, sulfuric acid, and electrolytes taught in U.S. Pat. Nos. 3,330,343 to Tosch et al. and 3,297,084 to Gogarty et al. Where the emulsion contains a high ionic content, a minimum of electrolyte can be incorporated within the micellar dispersion. Additionally, the electrolyte can be the salts or ions within the aqueous medium, e.g. within brine or brackish water. The type and concentration of electrolyte will depend on the aqueous medium, surfactant, cosurfactant, hydrocarbon, and the reservoir conditions, including temperature of the reservoir.

When the emulsion blockage contains a high ionic content, it is preferred that the micellar dispersion be designed to have a high affinity for brine. For example, the micellar dispersion can be designed with a lower molecular weight surfactant and a minimum amount of electrolyte—such can impart to the micellar dispersion a high brine affinity or a high "solubilization" potential for an emulsion containing a high brine content. Also, where the emulsion blockage is water-external, it may be desirable to design the micellar dispersion to be more waterlike in character and to have a high affinity for the emulsion. However, where the emulsion blockage is oil-external, it may be desired to design the micellar dispersion to have a high affinity for hydrocarbon and thus the components within the micellar dispersion are chosen to impart a more oleophilic character to the micellar dispersion.

The amount of micellar dispersion injected into the formation should be sufficient to "solubilize" substantially the emulsion causing the emulsion blockage. Certain factors which will determine the amount of micellar dispersion injected include: 1) the permeability of the formation (where the formation is less permeable, it may be desired to inject more of the micellar dispersion), 2) porosity, i.e. where the porosity is large, a larger amount of micellar dispersion is required, etc. However, a volume about equal to or in excess of the volume of emulsion should be about the maximum amount of micellar dispersion useful with the invention. Generally, from about less than 0.1 to about more than 10 barrels per vertical foot of hydrocarbon-bearing formation are useful to solubilize the emulsion.

After the micellar dispersion is injected into the formation, it is permitted to remain in contact for a sufficient period of time to solubilize the emulsion. Such time will vary with the particular formation, the volume and character of the emulsion, and the character of the micellar dispersion being injected. Examples of times include from about one-half to about 24 hours.

Thereafter, the well is permitted to produce the formation fluids through the well bore. In restoring the well to production, the solubilized emulsion will be backflowed and thus removed uphole.

It is intended that the invention not be limited by the specific embodiments taught herein. Rather all equivalents obvious to those skilled in the art are intended to be incorporated within the scope of this invention as defined within the specification and appended claims.

I claim:

1. A method of restoring production of formation fluids from a hydrocarbon-bearing subterranean formation having a well bore penetrating the formation and wherein said formation is blocked by a water and hydrocarbon emulsion surrounding the well bore, the method comprising:
   1. injecting from about 0.1 to about 10 barrels of micellar dispersion per vertical foot of hydrocarbon-bearing formation into the formation, the micellar dispersion containing at least about 5 percent water;
   2. permitting the micellar dispersion to solubilize the emulsion; and
   3. returning the well to production.

2. The method of claim 1 wherein the micellar dispersion is comprised of hydrocarbon, aqueous medium, and surfactant.

3. The method of claim 2 wherein the micellar dispersion contains cosurfactant.

4. The method of claim 2 wherein the micellar dispersion contains electrolyte.

5. The method of claim 2 wherein the surfactant is a petroleum sulfonate.

6. The method of claim 1 wherein the micellar dispersion is oil-external.

7. The method of claim 1 wherein the micellar dispersion is water-external.

8. The process of claim 1 wherein the micellar dispersion is comprised of about 4 percent to about 60 percent hydrocarbon, about 20—90 percent aqueous medium, and at least about 4 percent surfactant.

9. The process of claim 8 wherein the surfactant is a petroleum sulfonate having an average molecular weight within the range of about 360 to about 520.

10. A method of restoring production of formation fluids from a hydrocarbon-bearing subterranean formation having a well bore penetrating therein and wherein the formation is blocked by a water and hydrocarbon emulsion surrounding the well bore, the method comprising:
    1. injecting into the formation from about 0.1 to about 10 barrels per vertical foot of hydrocarbon-bearing formation of a micellar dispersion comprised of hydrocarbon, surfactant, and at least about 5 percent aqueous medium,
    2. permitting the micellar dispersion to remain in the formation until the emulsion is substantially solubilized by the micellar dispersion; and
    3. returning the well to production.

11. The method of claim 10 wherein the micellar dispersion contains cosurfactant.

12. The method of claim 11 wherein the cosurfactant is an alcohol containing from 1 to about 20 carbon atoms.

13. The method of claim 10 wherein the micellar dispersion contains electrolyte.

14. The method of claim 10 wherein the surfactant is a petroleum sulfonate having an average molecular weight within the range of from about 360 to about 520.

15. The method of claim 10 wherein the micellar dispersion is oil-external.

16. A method of restoring production of formation fluids from a hydrocarbon-bearing subterranean formation having a well bore penetrating the formation and wherein the formation is blocked by a water and hydrocarbon emulsion surrounding the well bore, the method comprising:
    1. injecting into the formation from about 0.1 to about 10 barrels per vertical foot of hydrocarbon-bearing formation of a micellar dispersion consisting of hydrocarbon, at least about 5 percent aqueous medium, petroleum sulfonate, electrolyte, and cosurfactant;
    2. permitting the micellar dispersion to remain in the formation to substantially solubilize the emulsion; and
    3. returning the well to production to permit the formation fluids to flow to the well bore.

17. The method of claim 16 wherein the micellar dispersion is oil-external.

18. The method of restoring production of formation fluids from a hydrocarbon-bearing subterranean formation having a well bore penetrating the formation wherein the formation is blocked by a water and hydrocarbon emulsion surrounding the well bore, the method comprising:
    1. injecting into the formation from about 0.1 to about 10 barrels per vertical foot of hydrocarbon-bearing formation of a micellar dispersion comprised of about 4 percent to about 60 percent of hydrocarbon, about 20 percent to about 90 percent aqueous medium, at least about 4 percent petroleum sulfonate having a average molecular weight within the range of about 360 to about 520, about 0.01 to about 20 percent cosurfactant, and about 0.001 to about 5 percent or more by weight of electrolyte;
    2. permitting the micellar dispersion to remain in the formation to substantially solubilize the emulsion; and
    3. returning the well to production to permit the formation fluids to flow to the well bore.

19. The method of claim 18 wherein the micellar dispersion is oil-external.

20. The method of claim 18 wherein the micellar dispersion is water-external.